US010389065B2

(12) United States Patent
Goodson, II et al.

(10) Patent No.: US 10,389,065 B2
(45) Date of Patent: Aug. 20, 2019

(54) ELECTRO-MECHANICAL SYSTEMS FOR POWER CORD DETECTION

(71) Applicant: Hewlett Packard Enterprise Development LP, Houston, TX (US)

(72) Inventors: Stewart Gavin Goodson, II, Houston, TX (US); Daniel Humphrey, Cypress, TX (US); Michael R. Miller, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 48 days.

(21) Appl. No.: 15/660,156

(22) Filed: Jul. 26, 2017

(65) Prior Publication Data

US 2019/0036274 A1 Jan. 31, 2019

(51) Int. Cl.

*G03B 13/00* (2006.01)
*H01R 13/641* (2006.01)
*H01R 43/26* (2006.01)
*H01R 13/66* (2006.01)

(52) U.S. Cl.

CPC ....... *H01R 13/641* (2013.01); *H01R 13/6691* (2013.01); *H01R 43/26* (2013.01)

(58) Field of Classification Search

CPC .... H04N 5/2228; H04N 5/2252; H04N 7/106; H04N 7/186; G03B 17/561; G03B 17/568
USPC .................................. 348/373–374; 455/572
See application file for complete search history.

(56) References Cited

U.S. PATENT DOCUMENTS 4,504,366 A * 3/1985 Jarrett ........................ C25B 9/12 204/219
5,062,806 A 11/1991 Ohno et al.
6,305,969 B1 10/2001 Sato
6,958,895 B1 * 10/2005 Radosavljevic ....... H01H 3/001 335/15
7,763,995 B2 * 7/2010 Joshi ...................... H01R 29/00 307/147
8,054,595 B2 * 11/2011 DiSalvo ................. H01H 71/62 361/42
8,638,064 B2 * 1/2014 Sulem .................... H01R 24/28 320/107
8,715,012 B2 5/2014 Taylor
9,336,975 B2 5/2016 Iizuka et al.
2016/0137083 A1 * 5/2016 Cho ..................... H01R 13/641 307/140
2018/0198323 A1 * 7/2018 Widmer ................. G01V 11/00

OTHER PUBLICATIONS

Yee, K., "MSP430 for detecting if 3.5mm jack has plug inserted into it?"; Dec. 28, 2012; 4 pages.

* cited by examiner

*Primary Examiner* — Phuong Chi T Nguyen
(74) *Attorney, Agent, or Firm* — Hewlett Packard Enterprise Patent Department

(57) ABSTRACT

Examples herein relate to an electro-mechanical system for power cord detection, the system comprising a pin contained in a cavity of a receptacle adapted to receive a power cord, the pin comprising a first conductive pad, a second and a third conductive pads forming an open circuit and separated from the first conductive pad and an electrical circuit. The first conductive pad is adapted to be moved responsive to the power cord depressing the pin and the electrical circuit provides a first output responsive to the first conductive pad shorting the second and the third conductive pads.

14 Claims, 7 Drawing Sheets

100

200

200

475

500

ELECTRO-MECHANICAL SYSTEMS FOR POWER CORD DETECTION

BACKGROUND

Mechanical systems comprising e.g. plates, rods, protrusions, springs, attachment elements, levers, etc. can cause a measureable alteration in an electrical circuit which may be directly related to a predetermined mechanical action. A power cord is an electrical cable that temporarily connects an appliance to the mains electricity supply via a socket.

BRIEF DESCRIPTION OF THE DRAWINGS

An input power cord received in a receptacle may not be fully or completely inserted. This fact may cause that power to become intermittent due to a poor contact between the power cord and the receptacle for the power cord. This could lead to seemingly unexpected interruptions to operation of appliances and may lead users to unsatisfactory experiences. The proposed solution can utilize a pin, e.g. a push rod actionable by the input cord entering into a receptacle. The full insertion of the power cord into the receptacle can cause a conductor connected to the pin to short contacts on a board. This short can cause a change of the state of a signal that may indicate a proper connection of the power cord in the receptacle. If an appliance or device receives power but this signal indicates the input power cord is not fully inserted a warning can be sent to the user to resolve the issue.

The following detailed description references the drawings, wherein.

DETAILED DESCRIPTION

Figure 1A:
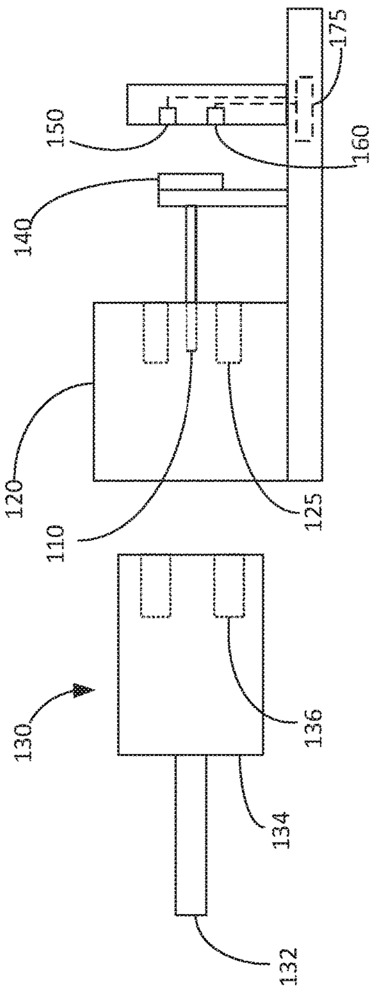
FIGS. 1A and 1B illustrate an example of an electro-mechanical system for power cord detection according to the present disclosure.

FIG. 1A shows an example of an electro-mechanical system 100 for power cord detection according to the present disclosure. The electro-mechanical system 100 comprises a pin 110 (e.g. a push rod) contained in a cavity of a receptacle 120 having two blades 125. The cavity can be adapted to receive a plug 134 which is part of a power cord 130. The plug 134 comprises two slots 136 adapted to couple the two blades 125 inside the receptacle 120. The power cord 134 can also comprise a cable 132. The pin 110 is attached to a first conductive pad 140. Furthermore, the system 100 furthers comprises a second and a third conductive pads 150 and 160 and an electrical circuit 175. The second and third conductive pads 150 and 160 are separated from the first conductive pad 140 and can form an open circuit on the electrical circuit 175. The plug 134 can be any existing plug as e.g. type A, type B, type Cm type BF etc. and the receptacle 120 can be any socket adapted to receive the plug 134.

Figure 1B:
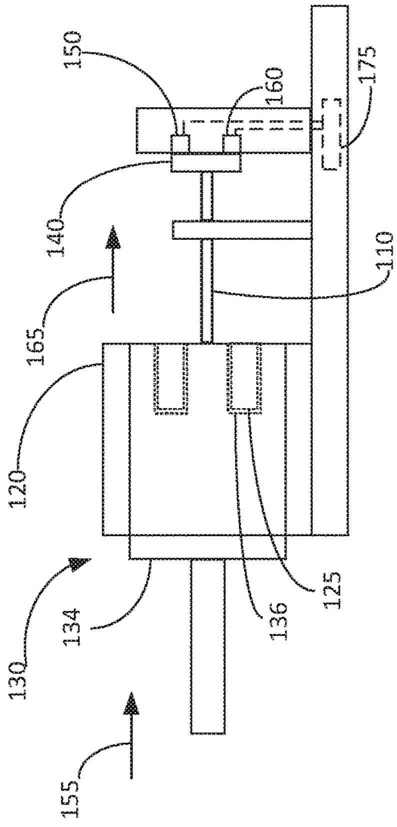

As shown in FIG. 1B, the first conductive pad 140 is adapted to be moved in the direction shown by arrow 165 responsive to the plug 134 depressing the pin 110 in the direction shown by arrow 155. In particular, the power cord 134 comprises a female plug 134 having two slots 136 configured to receive the two blades 125 comprised in the receptacle 120. The slots 136 are adapted to fit into the blades 125 as shown in FIG. 1B responsive to the plug 134 being received into the cavity of the receptacle 120.

In other implementations, other types of power cords could be used e.g. power cords with an additional ground slot. Furthermore, the electrical circuit 175 can provide a first output responsive to the first conductive pad 140 shorting the second and the third conductive pads 150 and 160 as shown in FIG. 1B. The first output may indicate that the power cord is correctly received inside the cavity of the receptacle.

Figure 2A:
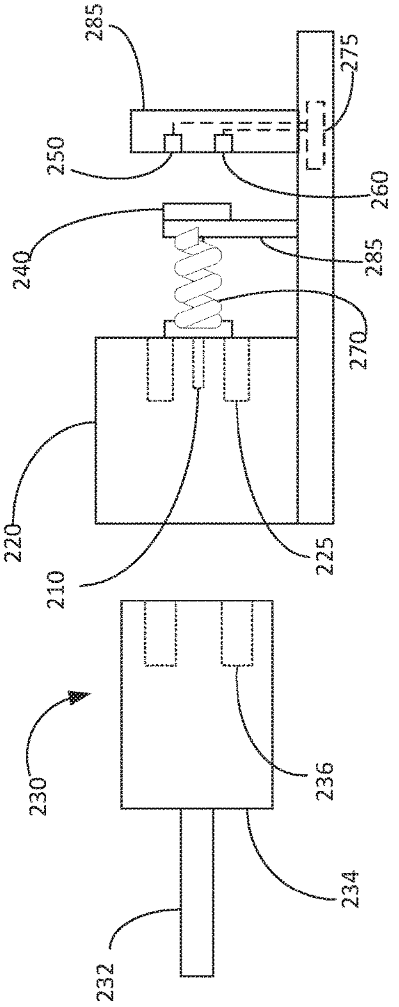
FIGS. 2A and 2B illustrate another example of an electro-mechanical system for power cord detection according to the present disclosure.
Figure 2B:
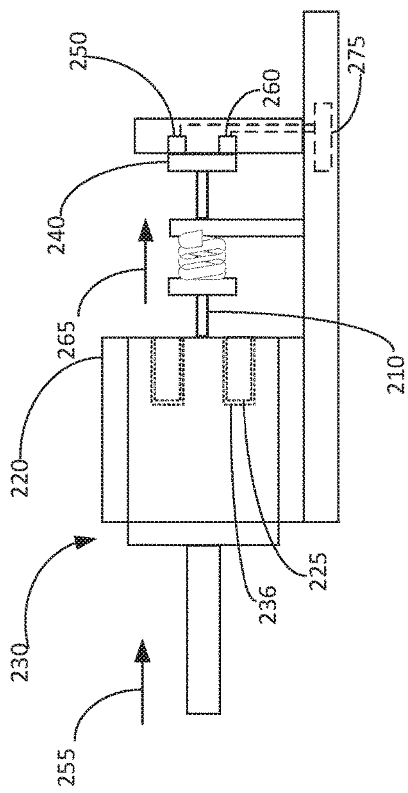

FIG. 2A and FIG. 2B show another example of an electro-mechanical system 200 for power cord detection according to the present disclosure. The electro-mechanical system 200 comprises a pin 210 contained in a cavity of a receptacle of a socket 220 on a rest position. The receptacle of the socket 220 comprises two blades 225. The cavity can be adapted to receive a power cord 230 via a plug. The power cord 230 comprises a cable 232, a female plug 234 having two slots 236. The pin 210 is fixed to a first conductive pad 240. Furthermore, the system 200 further comprises a second and a third conductive pads 250 and 260 and an electrical circuit 275. The second and third conductive pads 250 and 260 are separated from the first conductive pad 240 and can form an open circuit on the electrical circuit 275.

As shown in FIG. 2B, the first conductive pad 240 is adapted to be moved in the direction shown by arrow 265 responsive to the power cord 230 depressing the pin 210 in the direction shown by arrow 255. The slots 236 are adapted to fit into the blades 225 as shown in FIG. 2B responsive to the plug 230 being received into the cavity of the receptacle of the socket 220.

Furthermore, the system 200 comprises mechanical means 270 to move the pin 210 back to the rest position and structural means 285 adapted to support at least the pin 210, the first conductive pad 240 and the second and third conductive pads 250 and 260. The mechanical means 270 can be e.g. a spring as shown in FIG. 2A and FIG. 2B. The mechanical means 270 can permit moving the pin 210 back to its rest position which is shown in FIG. 2A. The mechanical means 270 can work responsive to removing the power cord 230 via the plug 234 from the cavity of the receptacle of the socket 220.

The electrical circuit 275 can provide a first output responsive to the first conductive pad 240 shorting the second and the third conductive pads 250 and 260 as shown in FIG. 2B. The first output may indicate that the power cord via the plug 234 is correctly received inside the cavity of the receptacle and hence the power cord 230 can be detected inside the socket 220.

Figure 3:
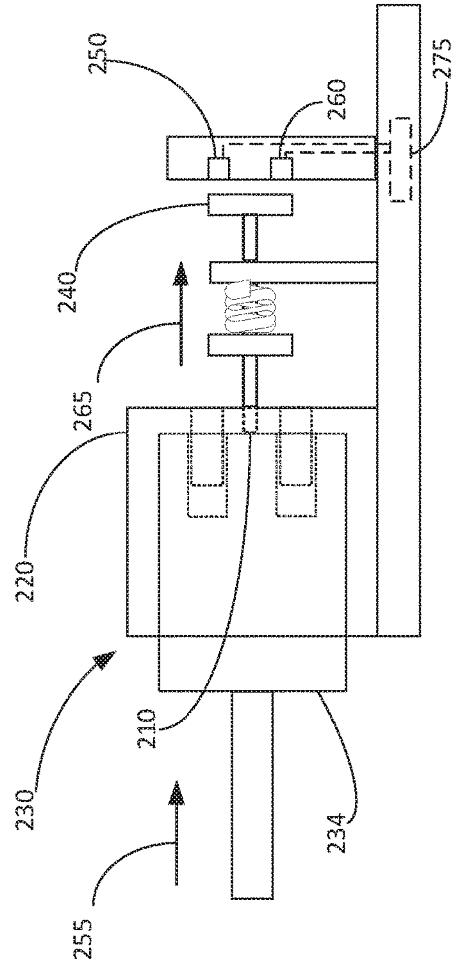
FIG. 3 illustrates an example of an electro-mechanical system for power cord detection.

Turning now to FIG. 3, the electrical circuit 275 can further provide a second output different from the first output, the second output indicating that the power cord 230 is not correctly received inside the cavity of the receptacle of the socket 220 responsive to the first conductive pad 240 not contacting the second and third conductive pads 250. 260.

FIG. 3 shows an example of the system 200 with the pin 210 not totally depressed by the power cord 230 via the plug 234 (e.g. half depressed) in the cavity of the receptacle of the socket 220 which can be adapted to receive the plug 234. In this scenario, the plug 234 may not be correctly or completely received inside the cavity of the receptacle of the socket 220 and hence, the first conductive pad 240 does not contact the second and third conductive pads 250 and 260. Hence, these pads 250 and 260 still can form an open circuit as shown in FIG. 3. During this scenario, the second output different from the first output provided in FIG. 2B can be provided by the electrical circuit 275. Therefore, the second output may indicate that the plug 234 is not correctly received in the cavity of the receptacle of the socket 220 in contrast to the first output.

In one implementation, the first output corresponds to a low level of voltage and the second output corresponds to a high level of voltage.

Figure 4B:
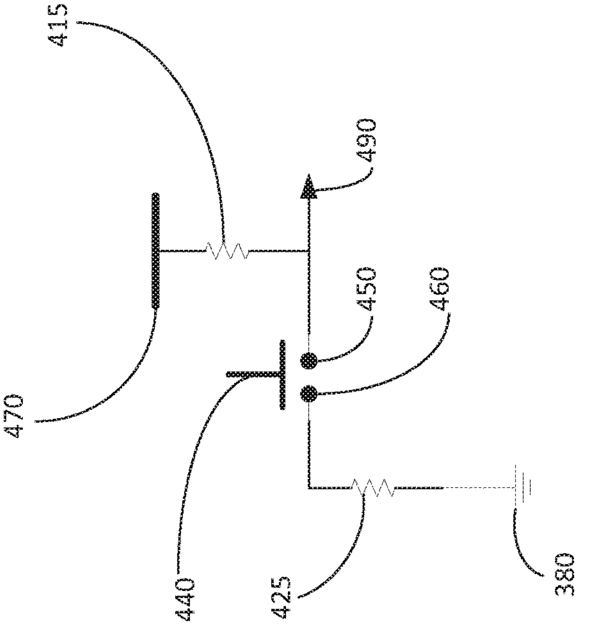
FIGS. 4A and 4B illustrate an example of elements of an electro-mechanical system for power cord detection.
Figure 4A:
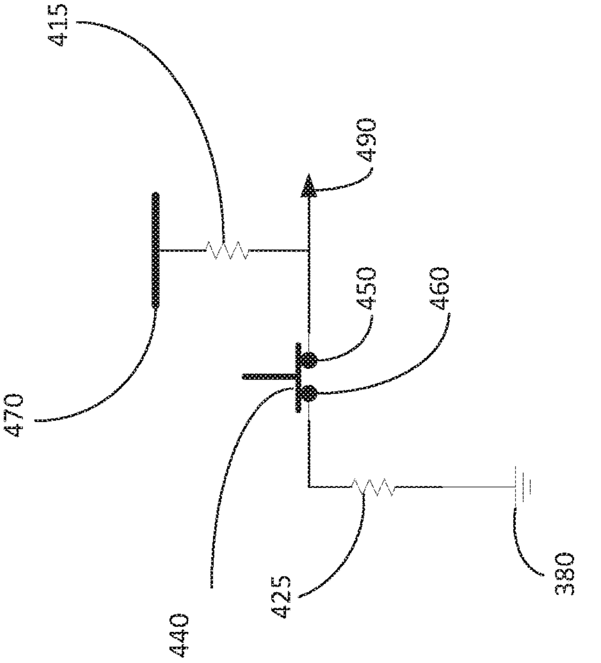

FIG. 4A and FIG. 4B show an example of an electrical circuit 470 that may correspond to the electrical circuits 175 and 275 previously shown in FIG. 1 to FIG. 3. The electrical circuit 475 comprises a first contactor 440 separated from second and third contacts 450 and 460. The second and third contacts are forming an open circuit. The output of the electrical circuit 475 is represented by arrow 490.

In FIG. 4A the output 490 of the electrical circuit 475 can provide a first voltage level corresponding to the first output related to the scenario of FIG. 2B. This first voltage level can correspond to the ground 380. This first voltage level can correspond to the first output responsive to the first conductive pad 440 shorting the second and the third conductive pads 450 and 460.

In FIG. 4B the output 490 can provide a second voltage level corresponding to the second output related to the scenario of FIG. 3. This second voltage level can correspond to the source 470. This second voltage level can correspond to the second output responsive to the first conductive pad 440 not contacting the second and third conductive pads 450 and 460.

Figure 5A:
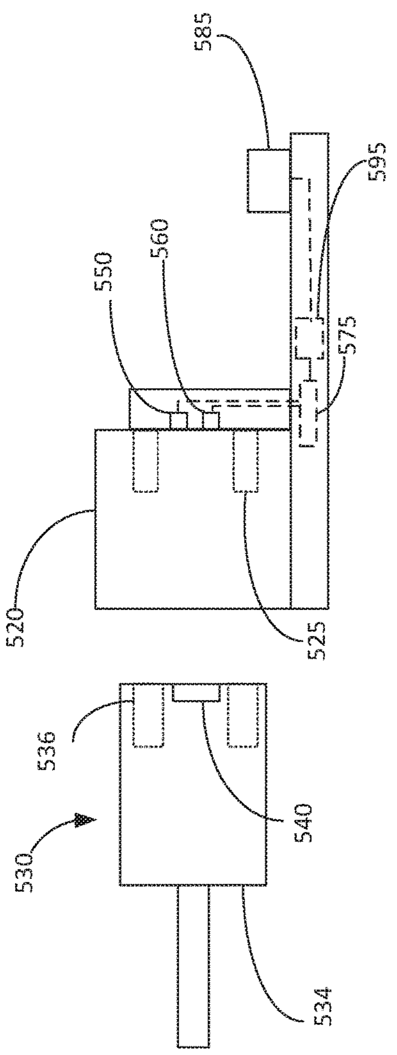
FIGS. 5A and 5B illustrate an example of an electro-mechanical system for power cord detection.

FIG. 5 shows another example of an electro-mechanical system 500 for power cord detection according to the present disclosure. FIG. 5A shows that the electro-mechanical system 500 comprises a first conductive pad 540 established on an outer surface of a plug 534 which is part of power cord 530. A cavity of a receptacle of a socket 520 can be adapted to receive the plug 534 of the power cord 530. Furthermore, the system 500 furthers comprises a second and a third conductive pads 550 and 560 and an electrical circuit 575. The second and third conductive pads 550 and 560 are separated from the first conductive pad 540 and can form an open circuit on the electrical circuit 575.

Figure 5B:
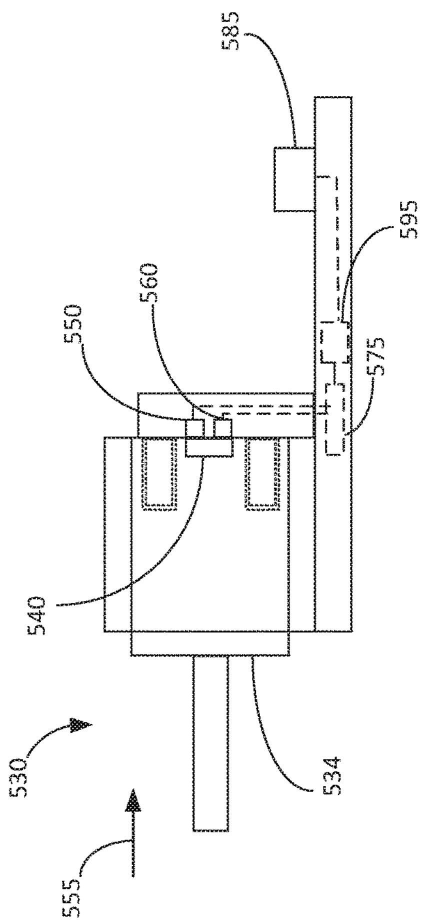

As shown in FIG. 5B, the plug 534 is adapted to be received into the cavity of the receptacle of the socket 520 responsive to the power cord being moved in the direction shown by the arrow 555. The electrical circuit 575 can provide a first output responsive to the first conductive pad 540 shorting e.g. contacting the second and the third conductive pads 550 and 560 as shown in FIG. 5B. The first output may indicate that the plug 534 is correctly received inside the cavity of the receptacle and hence, the power cord 530 is correctly detected. Furthermore, the electrical circuit 575 can provide a second output indicating that the plug 534 is not correctly received inside the cavity of the receptacle of the socket 520 responsive to the first conductive pad 540 not contacting the second and third conductive pads 550 and 560. System 500 further comprises transmission means 595 for transmitting the first and the second outputs to a computing device e.g. guided (twisted pair, optic fiber, coaxial, etc.) or wireless (e.g. RFID).

In this implementation, the system 500 is configured to provide a visual alarm signal by means of a led 585 connected to the electrical circuit 575 and responsive to the electrical circuit 475 providing the second voltage level and a device connected to by the power cord being in operation. Other types of alarm signals could be provided e.g. a sound alarm.

Figure 6A:
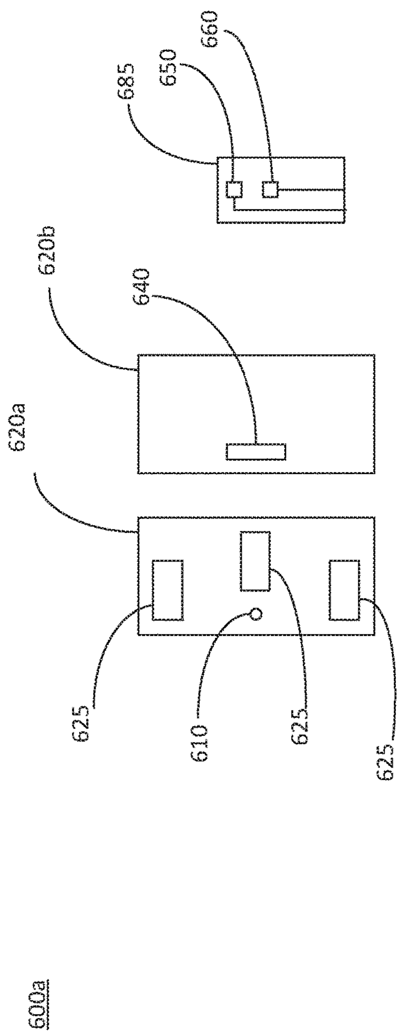
FIGS. 6A and 6B illustrate examples of elements of two electro-mechanical systems for power cord detection according to the present disclosure.

FIG. 6A shows an example of elements of an electro-mechanical system 600*a* for power cord detection according to the present disclosure. In particular, FIG. 6A shows a front side of a socket 620*a*, a rear side of the same socket 620*b* and a support structure 685 comprising conductive pads. The front side of the socket 620*a* comprises three blades 625 and a pin 610. Three slots comprised in a plug of a power cord (not shown) are adapted to fit into the three blades 625 responsive to the plug being received into the cavity of the socket 620*a*. The pin 610 comprises a first conductive pad 640. The first conductive pad 640 is shown in a rear side of the socket 620*b*.

Furthermore, the system 600*a* furthers comprises a second and a third conductive pads 650 and 660 as part of an electrical circuit and structural means 685 adapted to support the second and third conductive pads 650 and 660 and the electronic circuit (not shown). The second and third conductive pads 650 and 660 are separated from the first conductive pad 640 shown in rear side of the socket 620 and they form an open circuit on the electrical circuit.

The first conductive pad 640 can be moved towards the second a third conductive pads 650 and 660. The first conductive pad 640 can be moved responsive to a plug depressing the pin 610 located in the front side of the socket 620*a*. The plug can be part of a power cord configured to receive the three blades 625.

Hence, three slots comprised in the plug of the power cord (not shown) can be adapted to fit into the blades 625 in the socket 620*a* as shown in FIG. 1B responsive to the plug being received into a cavity of the socket 620*a*. The electrical circuit can provide a first output responsive to the first conductive pad 640 shorting the second and the third conductive pads 650 and 660 by contacting the second and third conductive pads.

A second output different from the first output can be provided by the electrical circuit. Therefore, the second output may indicate that the power cord is not correctly received in the cavity of the socket 620*a*. This may happen when the plug does not totally depress the pin 610 and hence, the second and third conductive pads 650 and 660 are not shorted by the first conductive pad 640.

Figure 6B:
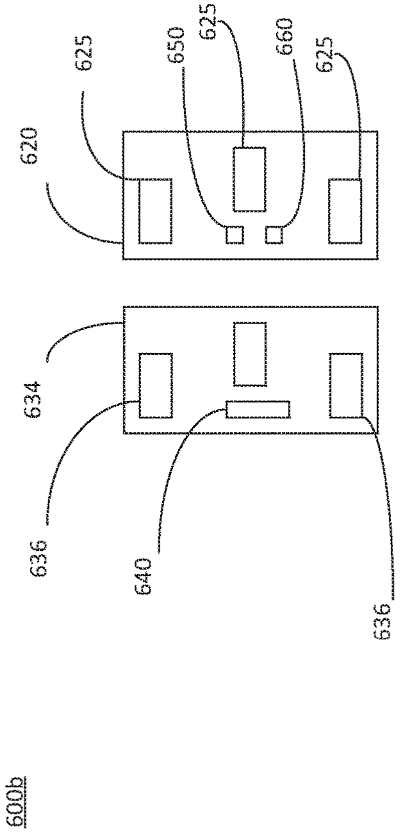

FIG. 6B shows another example of elements of an electro-mechanical system 600*b* for power cord detection according to the present disclosure. The elements shown are a plug 634 and a socket 620. The plug 634 comprises three slots 636 and a first contact pad 640. The plug 634 can be part of a power cord (not shown). The socket 620 comprises three blades 625 and a second and a third conductive pads 650 and 660 as part of an electrical circuit. The second and third conductive pads 650 and 660 are separated from the first conductive pad 640 which is part of the plug 634.

The second and third conductive pads 650 and 660 form an open circuit on the electrical circuit which can only be shorted if the first conductive pad 640 contacts the second and third conductive pads 650 and 660. This can be possible when the plug 634 completely enters into a receptacle formed in the socket 620 so that the first conductive pad 640 contacts the second and the third conductive pads 650 and 660.

Shorting the second and the third conductive pads 650 and 660 responsive to the first conductive pad 640 contacting the second and the third conductive pads 650 and 660 may cause the electronic circuit providing a first output as shown in FIG. 4A. The first output can indicate that the power cord via the plug 634 is correctly received inside the cavity of the socket 620.

An effect of the first conductive pad 640 not contacting the second and the third conductive pads 650 and 660 may cause the electronic circuit providing a second output as shown in FIG. 4B. Therefore, the second output may indicate that power cord via the plug 634 may not be correctly received inside the cavity of the socket 620 in contrast to the first output. With regard to the second output, a visual alarm signal or a sound alarm responsive to the electrical circuit providing the second output could be provided if a device is connected to by the power cord being and is in operation.

Figure 7:
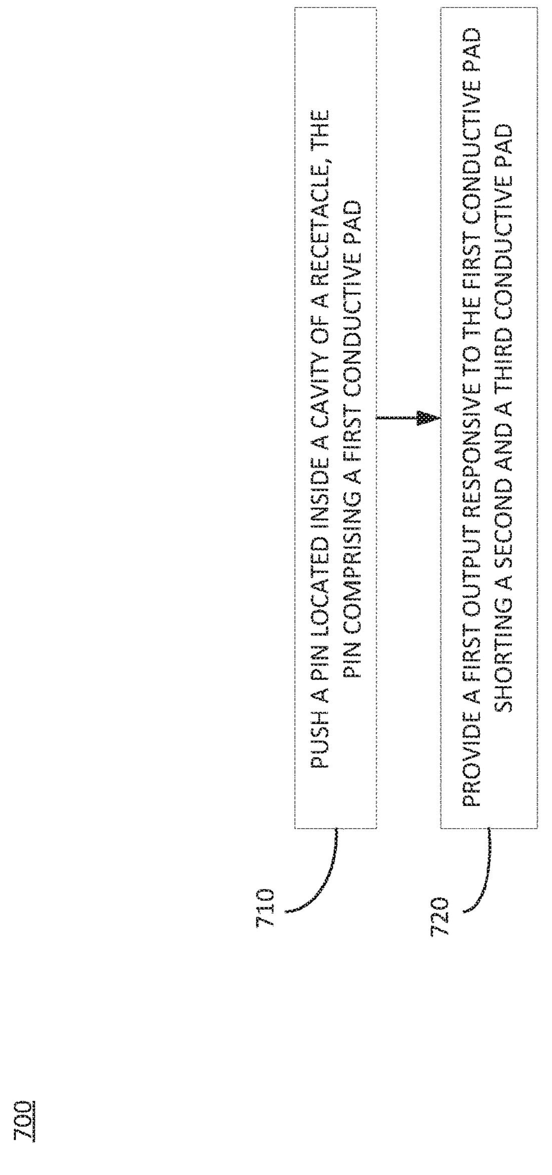
FIG. 7 illustrates an example of a flowchart for detecting a power cord.

FIG. 7 shows an example of a block diagram 700 for detecting a power cord, the diagram 700 comprises a block 710 for pushing a pin located inside a cavity of a receptacle adapted to receive a power cord. The pin can comprise a first conductive pad. Pushing the pin from a rest position can cause the movement of the first conductive pad. Diagram 700 further comprises a block 720 for an electrical circuit providing a first output responsive to the first conductive pad shorting a second and a third conductive pads. The first output can indicate that the power cord is correctly received inside the cavity of the receptacle. The second and third conductive pads are separated from the first conductive pad and can form an open circuit on an electrical circuit.

In some implementations, the diagram 700 can further comprise a block for providing mechanical means that cause the movement of the pin back to the rest position. The mechanical means can permit moving the pin back to its rest position which as shown in FIG. 2A. The mechanical means can work responsive to removing the power cord from the cavity of the receptacle.

In some implementations, the diagram 700 can further comprise a block for the electrical circuit providing a second output different from the first output indicating that the power cord is not correctly received inside the cavity of the receptacle responsive to the first conductive pad not contacting the second and third conductive pads.

In some implementations, the diagram 700 can further comprise a block for providing an alarm signal responsive to the electrical circuit providing the second output and a device connected to an electrical grid by the power cord being in operation. In a preferred implementation, the alarm signal could be a visual alarm signal as shown in FIG. 5 having a led that could be switched on responsive to the electrical circuit providing the second output and a device connected to by the power cord being in operation. Other types of alarm signals could be e.g. a sound alarm.

In some implementations, the diagram 700 can further comprise a block for transmitting the first and the second output to a computing device as e.g. transmission means as shown in FIG. 5 for transmitting the first and the second outputs to a computing device e.g. guided (twisted pair, optic fiber, coaxial, etc.) or wireless (e.g. RFID).

Furthermore, relative terms used to describe the structural features of the figures illustrated herein are in no way limiting to conceivable implementations. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

The invention claimed is:

1. An electro-mechanical system for power cord detection, the system comprising:

a pin contained in a cavity of a receptacle adapted to receive a power cord;

the pin comprising a first conductive pad;

an electrical circuit; and a second and a third conductive pads forming an open circuit on the electrical circuit and separated from the first conductive pad, wherein the first conductive pad is adapted to be moved responsive to the power cord depressing the pin, and wherein the electrical circuit provides a first output responsive to the first conductive pad shorting the second and the third conductive pads.

2. The system for power cord detection of claim 1, wherein the contactor is a conductive plate.

3. The system for power cord detection of claim 1, further comprising mechanical means for moving the pin to a rest position.

4. The system for power cord detection of claim 3, further comprising structural means for supporting the pin and the second and third conductive pads.

5. The system for power cord detection of claim 1, wherein the first output indicates that the power cord is correctly received inside the cavity of the receptacle.

6. The system for power cord detection of claim 5, wherein the first output corresponds to a low level of voltage.

7. The system for power cord detection of claim 1, wherein the electrical circuit further provides a second output different from the first output, the second output indicating that the power cord is not correctly received inside the cavity of the receptacle responsive to the contactor not shorting the first contact and the second contact.

8. The system for power cord detection of claim 7, wherein the system is configured to activate an alarm signal responsive to:

the electrical circuit providing the second output; and a device connected to an electrical grid by the power cord being in operation.

9. The system for power cord detection of claim 1, wherein the electrical circuit further provides a second output different from the first output, the second output indicating that the power cord is not correctly received inside the cavity of the receptacle responsive to the first conductive pad not contacting the second and third conductive pads.

10. The system for power cord detection of claim 9, wherein the second output corresponds to a high level of voltage.

11. The system for power cord detection of claim 10, wherein the system is configured to activate an alarm signal responsive to:

the electrical circuit providing the second output; and a device connected to an electrical grid by the power cord being in operation.

12. The system for power cord detection of claim 11, further comprising transmission means for transmitting the first and the second outputs to a computing device.

13. A electro-mechanical system for power cord detection, the system comprising:

a first contact contained in a bottom of a receptacle adapted to receive a power cord, the power cord having a metallic contactor;

a second contact contained in the bottom separated from the first contact; and an electrical circuit, wherein the electrical circuit provides a first output responsive to the contactor shorting the first contact and the second contact by introducing the power cord into the receptacle.

14. The system of claim 13, wherein the first output indicates that the power cord is correctly received inside the cavity of the receptacle.

* * * * *